US009827984B2

United States Patent
Liu et al.

(10) Patent No.: US 9,827,984 B2
(45) Date of Patent: Nov. 28, 2017

(54) METHODS AND APPARATUSES FOR CONTROLLING A PERSONAL TRANSPORTATION VEHICLE

(71) Applicant: Xiaomi Inc., Beijing (CN)

(72) Inventors: Huayijun Liu, Beijing (CN); Mingyong Tang, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/148,635

(22) Filed: May 6, 2016

(65) Prior Publication Data

US 2017/0088131 A1     Mar. 30, 2017

(30) Foreign Application Priority Data

Sep. 28, 2015   (CN) .......................... 2015 1 0626948

(51) Int. Cl.
*B60W 30/08* (2012.01)
*G05D 1/00* (2006.01)
(Continued)

(52) U.S. Cl.
CPC ......... *B60W 30/08* (2013.01); *B60W 2420/42* (2013.01); *B60W 2550/10* (2013.01); *B60W 2720/106* (2013.01)

(58) Field of Classification Search
CPC combination set(s) only.
See application file for complete search history.

(56) References Cited

U.S. PATENT DOCUMENTS

| 4,230,341 A | 10/1980 | Hart et al. |
| 6,842,692 B2 * | 1/2005 | Fehr ...................... G01C 21/20 701/23 |

(Continued)

FOREIGN PATENT DOCUMENTS

| CN | 101056680 A | 10/2007 |
| CN | 203268232 U | 11/2013 |

(Continued)

OTHER PUBLICATIONS

PCT International Search Report issued from the Chinese Patent Office; dated Jul. 5, 2016, for International Application No. PCT/CN2015/099062 (12 pgs.).

(Continued)

*Primary Examiner* — Yonel Beaulieu
(74) *Attorney, Agent, or Firm* — Finnegan, Henderson, Farabow, Garrett & Dunner LLP

(57) ABSTRACT

Disclosed includes a method for controlling a personal transportation vehicle, the method being performed by a processor coupled with one or more driving motors of the personal transportation vehicle and with a turning control component and comprising: determining information about a height of an obstacle; determining, based on the information about the height of the obstacle, whether the personal transportation vehicle is capable of running over the obstacle; and after determining that the personal transportation vehicle is not capable of running over the obstacle: transmitting a first signal to the one or more driving motors to reduce a driving force, to cause the personal transportation vehicle to decelerate, and transmitting a second signal to disable the turning control component. As a result, the likelihood that one of the wheels of the vehicle becomes blocked by an obstacle can be reduced, and the safety of the vehicle operation can be improved.

13 Claims, 9 Drawing Sheets

(51) Int. Cl.
 *G01C 21/20* (2006.01)
 *A61G 5/00* (2006.01)

(56) References Cited

U.S. PATENT DOCUMENTS

| | | | |
|---|---|---|---|
| 9,216,763 B2* | 12/2015 | Huntzinger | B60G 3/08 |
| 2003/0000754 A1* | 1/2003 | Daudt | B62K 11/00 |
| | | | 180/220 |
| 2006/0151218 A1* | 7/2006 | Goren | A61G 5/061 |
| | | | 180/24.02 |
| 2009/0242284 A1* | 10/2009 | Whetstone, Jr. | B62B 5/0026 |
| | | | 180/19.2 |
| 2009/0242285 A1* | 10/2009 | Whetstone, Jr. | B62D 49/0692 |
| | | | 180/19.2 |
| 2011/0190935 A1 | 8/2011 | Hutcheson et al. | |
| 2012/0136666 A1* | 5/2012 | Corpier | A61G 5/024 |
| | | | 704/275 |
| 2012/0166048 A1 | 6/2012 | Inoue et al. | |
| 2013/0081885 A1* | 4/2013 | Connor | A61G 5/06 |
| | | | 180/8.2 |
| 2014/0018994 A1* | 1/2014 | Panzarella | G05D 1/0212 |
| | | | 701/25 |
| 2015/0127246 A1 | 5/2015 | Guo | |
| 2016/0070269 A1 | 3/2016 | Kamen et al. | |

FOREIGN PATENT DOCUMENTS

| | | |
|---|---|---|
| CN | 103558778 A | 2/2014 |
| CN | 103770872 A | 5/2014 |
| CN | 204110256 U | 1/2015 |
| CN | 104386183 A | 3/2015 |
| CN | 104443140 A | 3/2015 |
| CN | 104503450 A | 4/2015 |
| CN | 104571104 A | 4/2015 |
| CN | 204423150 U | 6/2015 |
| CN | 204440053 U | 7/2015 |
| EP | 1901257 A1 | 3/2008 |
| JP | 2007219986 | 8/2007 |
| JP | 2009248772 | 10/2009 |
| RU | 2550560 C2 | 5/2015 |
| WO | WO 2006/137545 A1 | 12/2006 |
| WO | WO 2011/022026 A1 | 2/2011 |

OTHER PUBLICATIONS

Extended European Search Report issued for corresponding Application No. EP 16189990.1-1802, dated Feb. 20, 2017 (7 pgs.).
English version of PCT International Search Report issued from the Chinese Patent Office; dated Jul. 5, 2016, for International Application No. PCT/CN2015/099062.

* cited by examiner

METHODS AND APPARATUSES FOR CONTROLLING A PERSONAL TRANSPORTATION VEHICLE

CROSS-REFERENCE TO RELATED APPLICATIONS

This application is based upon and claims the priority of the Chinese patent application No. 201510626948.2 filed on Sep. 28, 2015, which is incorporated herein by reference in its entirety.

TECHNICAL FIELD

The present disclosure relates to the field of automatic control, and more particularly, to a method and apparatus for controlling a personal transportation vehicle.

BACKGROUND

Personal transportation vehicles, such as two-wheel self-balancing vehicles, have become a popular means for short-distance travel.

A personal transportation vehicle typically includes at least two wheels operating in parallel, and a turning control component. The vehicle can be propelled forward or backward by an internal driving motor. When the vehicle is in motion, it can be controlled by the turning control component to make a turn. If there is an obstacle in front of a moving vehicle in motion, such that one of the wheels stops and the other wheel continues moving, the vehicle can get into a spinning motion, which can cause a person standing on the vehicle to fall over.

SUMMARY

The embodiments of the present disclosure provide a method for controlling a personal transportation vehicle, and an apparatus thereof.

On one hand, a method for controlling a personal transportation vehicle is provided. The method is performed by a processor coupled with one or more driving motors of the personal transportation vehicle and with a turning control component, and comprises: determining information about a height of an obstacle; determining, based on the information about the height of the obstacle, whether the personal transportation vehicle is capable of running over the obstacle; and after determining that the personal transportation vehicle is not capable of running over the obstacle: transmitting a first signal to the one or more driving motors to reduce a driving force, to cause the personal transportation vehicle to decelerate, and transmitting a second signal to disable the turning control component.

On the other hand, a personal transportation vehicle is provided. The personal transportation vehicle comprises: at least two parallel wheels; a control chip; a storage for storing instructions executable by the control chip; a turning control component coupled with the control chip; wherein, the control chip is configured to: determine information about a height of an obstacle; determine, based on the information about the height of the obstacle, whether the personal transportation vehicle is capable of running over the obstacle; after determining that the personal transportation vehicle is not capable of running over the obstacle: transmit a first signal to the one or more driving motors to reduce a driving force, to cause the personal transportation vehicle to decelerate, and transmit a second signal to disable the turning control component.

Further, a non-transitory computer-readable storage medium is provided. The non-transitory computer-readable medium stores instructions that, when executed by a processor of an apparatus, causes the apparatus to perform a method for controlling a personal transportation vehicle. The method comprises: determining information about a height of an obstacle; determining, based on the information about the height of the obstacle, whether the personal transportation vehicle is capable of running over the obstacle; and after determining that the personal transportation vehicle is not capable of running over the obstacle: transmitting a first signal to the one or more driving motors to reduce a driving force, to cause the personal transportation vehicle to decelerate, and transmitting a second signal to disable the turning control component.

With embodiments of the present disclosure, a control system can determine information about the height of an obstacle in front of a personal transportation vehicle. If the control system determines that the obstacle is too high to be run over by the vehicle, the control system can control the personal transportation vehicle to decelerate, and to prevent the personal transportation vehicle from making a turn. Such arrangements can reduce the likelihood that one of the wheels of the vehicle becomes blocked by the obstacle and the other wheel continues moving, such that the vehicle gets into a spinning motion and causes the operator to fall over. As a result, the safety of the vehicle operation can be improved.

It should be understood that both the foregoing general description and the following detailed description are only exemplary and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
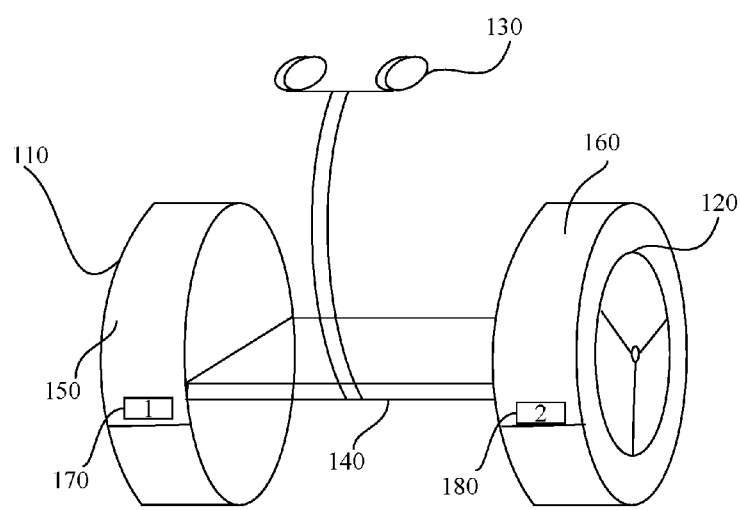
FIG. 1 is a schematic diagram illustrating a personal transportation vehicle according to exemplary embodiments of the present disclosure.

FIG. 1 is a schematic diagram illustrating a personal transportation vehicle 100 according to exemplary embodiments of the present disclosure. As shown in FIG. 1, the personal transportation vehicle 100 may be a two-wheel self-balancing vehicle that comprises two parallel wheels 110 and 120, two wheel housings 150 and 160 corresponding with the two parallel wheels 110 and 120, respectively, a turning control component 130, a load bearing pedal 140, and obstacle detection components 170 and 180. It is understood that the description of a personal transportation vehicle, such as a two-wheel self-balancing vehicle, is provided in this disclosure as an illustrative example, and that embodiments of the present disclosure is suitable for any types of vehicles.

The turning control component 130 is connected with the load bearing pedal 140, and can be used to control the turning of the personal transportation vehicle 100. In this example, the turning control component 130 can receive an input, such as a detection of a pressing action by an operator's legs on the load bearing pedal 140. It is understood that the turning control component 130 can also receive other forms of inputs, such as a detection of a motion of other body parts of the operator, and are not limited to the forms of inputs described in this disclosure.

The obstacle detection component 170 is used for detecting an obstacle in front of one of the parallel wheels of the personal transportation vehicle 100, and the obstacle detection component 180 is used for detecting an obstacle in front of the other of the parallel wheels of the personal transportation vehicle 100. As an illustrative example, the obstacle detection component 170 can be used for detecting an obstacle in front of the right-side wheel in the heading direction, and the obstacle detection component 180 can be used for detecting an obstacle in front of the left-side wheel in the heading direction. The obstacle detection components 170 and 180 can include any sensing components capable of detecting a size and a distance of an object such as, for example, an infrared sensing apparatus, an ultrasonic wave sensing apparatus, a laser range finder, etc. The obstacle detection components 170 and 180 can also include any image acquiring components capable of capturing images, such as a camera.

As shown in the illustrative example of FIG. 1, the obstacle detection component 170 is disposed at a position 1 of the wheel housing 150, and the obstacle detection component 180 is disposed at a position 2 of the wheel housing 160. The obstacle detection components 170 and 180 may also be disposed at other positions of the personal transportation vehicle 100, such as at the position where the load bearing pedal 140 is engaged with the turning control component 130. Besides, although the illustrative example in FIG. 1 shows two obstacle detection components 170 and 180, it is understood that any number of obstacle detection components can be used in embodiments of the present disclosure.

Further, the personal transportation vehicle 100 also includes a control system and a driving motor (not shown in the figures). The control system can be implemented on an integrated circuit controller chip, and can interact with the driving motor, as well as the above-mentioned turning control component 130 and obstacle detection components 170 and 180. As to be discussed below, the control system can control a driving force of the driving motors, a speed and a moving direction of the personal vehicle, etc. The control system can be implemented as a set of instructions to be executed on the controller chip, and the instructions can be stored in a storage (e.g., a volatile memory device, a non-volatile drive, etc.) installed on the vehicle. The controller chip can be installed on the personal transportation vehicle 100, or can be part of a mobile terminal (e.g., a smart phone) that can communicate wirelessly, or using wired data buses, with the above-mentioned turning control component 130 and obstacle detection components 170 and 180.

Figure 2:
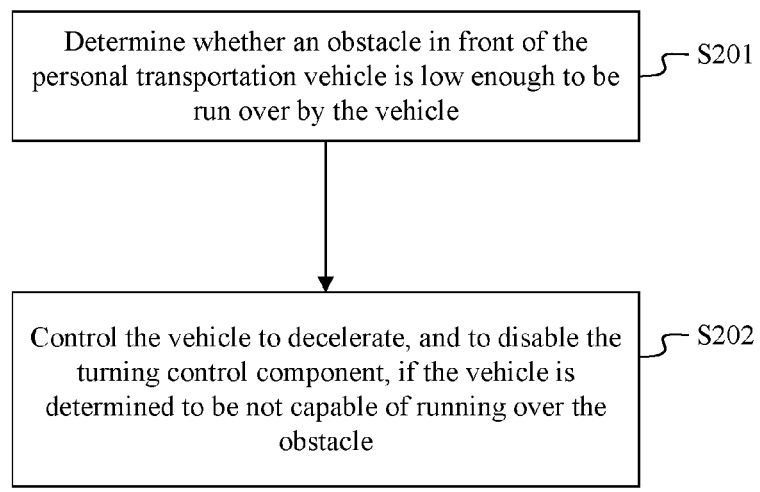
FIG. 2 is a flowchart illustrating a method for controlling a personal transportation vehicle, according to an exemplary embodiment.

FIG. 2 is a flowchart illustrating a method 200 for controlling a personal transportation vehicle, according to an exemplary embodiment. In some embodiments, the method 200 can be performed by a control system installed on a personal transportation vehicle (e.g., the personal transportation vehicle 100). As shown in FIG. 2, the method 200 comprises steps S201 and S202.

In step S201, the system determines whether an obstacle in front of any of the wheels (e.g., wheels 110 and 120) is low enough to be run over by the vehicle.

In some embodiments, the control system can include the aforementioned control chip and the obstacle detection components 170 and 180. The obstacle detection components comprise at least one of a distance measuring component and an image acquiring component.

In step S202, if the system determines that the obstacle is too high to be run over by the vehicle, the system can control the personal transportation vehicle to decelerate (e.g., by transmitting a signal to the driving motors to reduce a driving force), and to prevent the personal transportation vehicle from making a turn (e.g., by disabling the turning control component 130).

With embodiments of the present disclosure, a control system can determine information about the height of an obstacle in front of a personal transportation vehicle. If the control system determines that the obstacle is too high to be run over by the vehicle, the control system can control the personal transportation vehicle to decelerate, and to prevent the personal transportation vehicle from making a turn. Such arrangements can reduce the likelihood that one of the wheels of the vehicle becomes blocked by the obstacle and the other wheel continues moving, such that the vehicle gets into a spinning motion and causes the operator to fall over. As a result, the safety of the vehicle operation can be improved.

Figure 3:
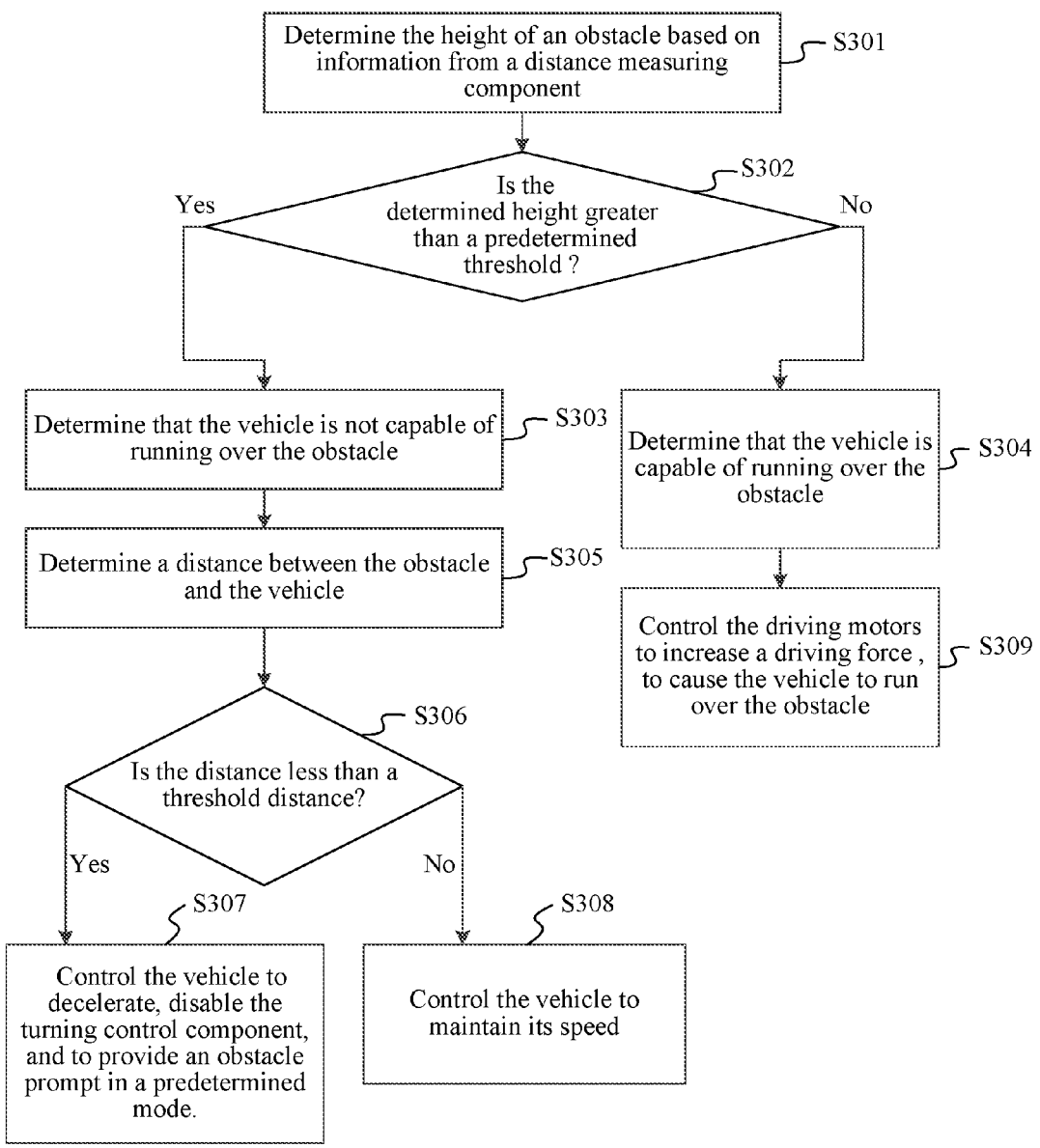
FIG. 3 is a flowchart illustrating a method for controlling a personal transportation vehicle, according to an exemplary embodiment.

FIG. 3 is a flowchart illustrating a method 300 for controlling a personal transportation vehicle, according to an exemplary embodiment. In some embodiments, the method 300 can be performed by a control system including (or interfacing with) one or more distance measuring components installed on a personal transportation vehicle. As shown in FIG. 3, the method 300 comprises steps S301-S309.

In step S301, the system determines, using a distance measuring component, the height of an obstacle in front of the vehicle.

In some embodiments, the control system can cause the distance measuring component to transmit a signal outwards at predetermined intervals. The signal may be laser signals, infrared signals, and ultrasonic signals, etc. The distance measuring component may receive a reflected signal generated by the transmitted signal reflecting off the obstacle. The reception of the reflected signal, by the distance measuring component, can indicate that there is an obstacle in front of the personal transportation vehicle.

In some embodiments, a distance measuring component can be mounted on each of two wheel housings of a two-wheel self-balancing vehicle (e.g., the wheel housings 150 and 160). If a distance measuring component on one of the wheel housings receives a reflected signal, the reception can indicate that there is an obstacle in front of the wheel housing (and the wheel beneath the wheel housing). Moreover, the mounting height of the distance measuring component, relative to ground, can also define a detectable height of the obstacle. For example, that the minimum detectable height of the obstacle can be defined to be equal to the mounting height of the distance measuring component.

As an illustrative example, the distance measuring components are mounted on each of the wheel housings, such that they are at a height of 5 cm from the ground. If any of the mounted distance measuring components receives a reflected signal, it can indicate an obstacle with a height of at least 5 cm in front of the wheels. On the other hand, if none of the mounted distance measuring components receives a reflected signal, it can also indicate that there is no obstacle with a height of over 5 cm in front of the wheels.

In some embodiments, one or more distance measuring components may also be mounted at a position where the load bearing pedal is engaged with the turning control component. The distance measuring components can also determine a relative direction of the obstacle with respect to the left wheel and the right wheel based on, for example, whether the received reflected signal comes from a left side or a right side of the distance measuring components.

It will be understood that the examples of mounting locations of the distance measuring components are provided herein for illustrative purpose only, and do not limit the scope of the present disclosure.

In step S302, the system determines whether the height of the obstacle is greater than a predetermined threshold.

In some embodiments, the predetermined threshold can be related to a mounting height of the distance measuring components. For example, in a case where the distance measuring components are mounted on the wheel housings, the predetermined threshold can be set at a value equal to the mounting height of the distance measuring components, which can indicate the maximum height of an obstacle that the vehicle can run over. In some embodiments, the predetermined threshold may include a certain fraction of the height of the wheels, a fraction of certain numerical values, etc., and is not limited to those described in this disclosure.

The distance measuring components can repeatedly transmit a signal outwards and then monitor for a reflected signal. If the distance measuring components receive a reflected signal, the system may determine that there is an obstacle with a height greater than the predetermined threshold in front of the wheels. On the other hand, if no reflected signal is received, the system may determine that there is no obstacle with a height greater than the predetermined threshold in front of the wheels.

In some embodiments, a group of two distance measuring components may be mounted respectively on each of the two wheel housings. Within each group, the two distance measuring components can be arranged one above the other relative to the ground. The upper distance measuring component can be mounted at a first mounting height (relative to ground) that corresponds to a first maximum height of an obstacle that the vehicle can run over when the vehicle accelerates. The lower distance measuring component can be mounted at a second mounting height (relative to ground) that corresponds to a second maximum height of an obstacle that the vehicle can run over when the vehicle is at a certain speed without acceleration.

Based on a reception status of the reflected signals at the upper and lower distance measuring components, the system can generate different determinations about the obstacle. For example, if the upper distance measuring component receives a reflected signal, the system can determine that there is an obstacle in front of the wheel that is too high to be run over by the vehicle. On the other hand, if upper distance measuring component does not receive a reflected signal, but the lower distance measuring component receives a reflected signal, the system can determine that the obstacle is low enough to be run over by the vehicle, if the vehicle accelerates. Further, if neither of the two distance measuring components receives a reflected signal, the system can determine that there is either no obstacle, or that the obstacle can be run over by the vehicle at its current speed without acceleration.

It is understood that that the above descriptions of using distance measuring components to determine the height of obstacles are provided for illustrative examples only, and do not limit the scope of the present disclosure.

Figure 4:
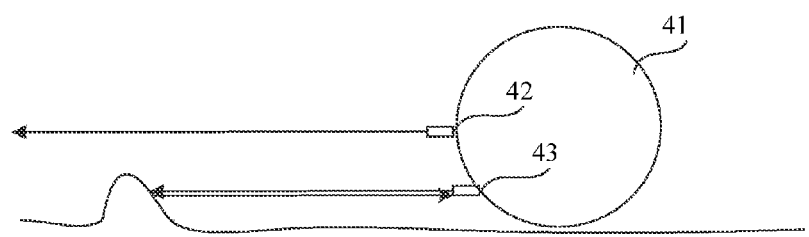
FIG. 4 is a diagram illustrating an obstacle detection determination result provided by the exemplary method of FIG. 3.

Reference is now made to FIG. 4, which illustrates an obstacle detection determination result provided by the exemplary method of FIG. 3. As shown in FIG. 4, each of a first distance measuring component 42 and a second distance measuring component 43 can transmit a signal outwards. Based on a determination that the first distance measuring component 42 does not receive a reflected signal, and the second distance measuring component 43 receives a reflected signal, the control system can determine that the obstacle in front of the vehicle can be run over by wheel 41 if it accelerates.

Referring back to FIG. 3, in step S302, if the height of the obstacle is determined to be greater than the predetermined threshold, the system will proceed to step S303 and determine that obstacle is too high to be run over by the vehicle. The determination can be made when, for example, at least one of the distance measuring components mounted at a height that corresponds to predetermined threshold receives a reflected signal.

After determining that obstacle is too high to be run over by the vehicle, the system will proceed to step S305 to determine a distance between the obstacle and the vehicle. In some embodiments, the system can determine a distance between the obstacle and the vehicle based on information from the distance measuring components. For example, the system can determine the distance based on a transmission time of a transmitted signal and a reception time of a reflected signal that corresponds to the transmitted signal, as well as a speed of the vehicle.

In step S306, the system determines whether the distance determined in step S305 is less than a predetermined threshold distance. In some embodiments, the predetermined distance can be determined based on, for example, a turning radius of the vehicle. The predetermined distance can also be determined based on, for example, a diameter of the wheels, other numerical values, etc., and is not limited by the examples provided in the present disclosure.

If the system determines in step S306 that the distance is greater than (or equal to) the threshold distance, the system will proceed to step S308 to control the vehicle to maintain its speed (e.g., by transmitting a signal to the driving motors to maintain a driving force). On the other hand, if the system determines in step S306 that the distance is less than the threshold distance, the system will proceed to step S307 to control the vehicle to decelerate (e.g., by transmitting a signal to the driving motors to reduce a driving force), to reduce the likelihood of collision with the obstacle (or to reduce the impact force when the collision occurs).

Further, in step S307, the system also disables the turning control component to prevent the vehicle from turning in response to an instruction from the operator of the vehicle when the collision occurs, to reduce the likelihood of the operator falling over when the vehicle making a turn when hitting the obstacle.

In some embodiments, in step S307, the system also provides an obstacle prompt in a predetermined mode. The predetermined mode comprises at least one of: causing a speaker to play a prompt tone, causing a predetermine part of the personal transportation vehicle to vibrate, causing a signal light to flicker, etc.

As an illustrative example, if the system determines that there is an obstacle with a height exceeding a predetermined threshold in front of the vehicle, and that a distance between the obstacle and the vehicle is equal to (or less than) the threshold distance, the system will cause the vehicle to generate a beep prompt tone to alert the operator.

On the other hand, if in step S302 the system determines that the height of the obstacle is lower than or equal to the predetermined threshold, the system will proceed to step S304 and determine that the vehicle is capable of running over the obstacle. The system then proceeds to step S309 to control the driving motors to increase a driving force, to cause the vehicle to run over the obstacle.

With embodiments of the present disclosure, the system can detect an obstacle in front of the vehicle and determine information about the height of the obstacle. The system can determine whether the vehicle is capable of running over that obstacle based on the height information. If the system determines that the vehicle is not capable of running over the obstacle, it can control the vehicle to decelerate, to reduce the likelihood of collision with the obstacle (or to reduce the impact force when the collision occurs). Further, the system can also disable the turning control components to prevent the vehicle from turning in response to an instruction from the operator of the vehicle when the collision occurs, to reduce the likelihood of the operator falling over when the vehicle making a turn when hitting the obstacle. As a result, the safety of the vehicle operation can be improved.

Figure 5:
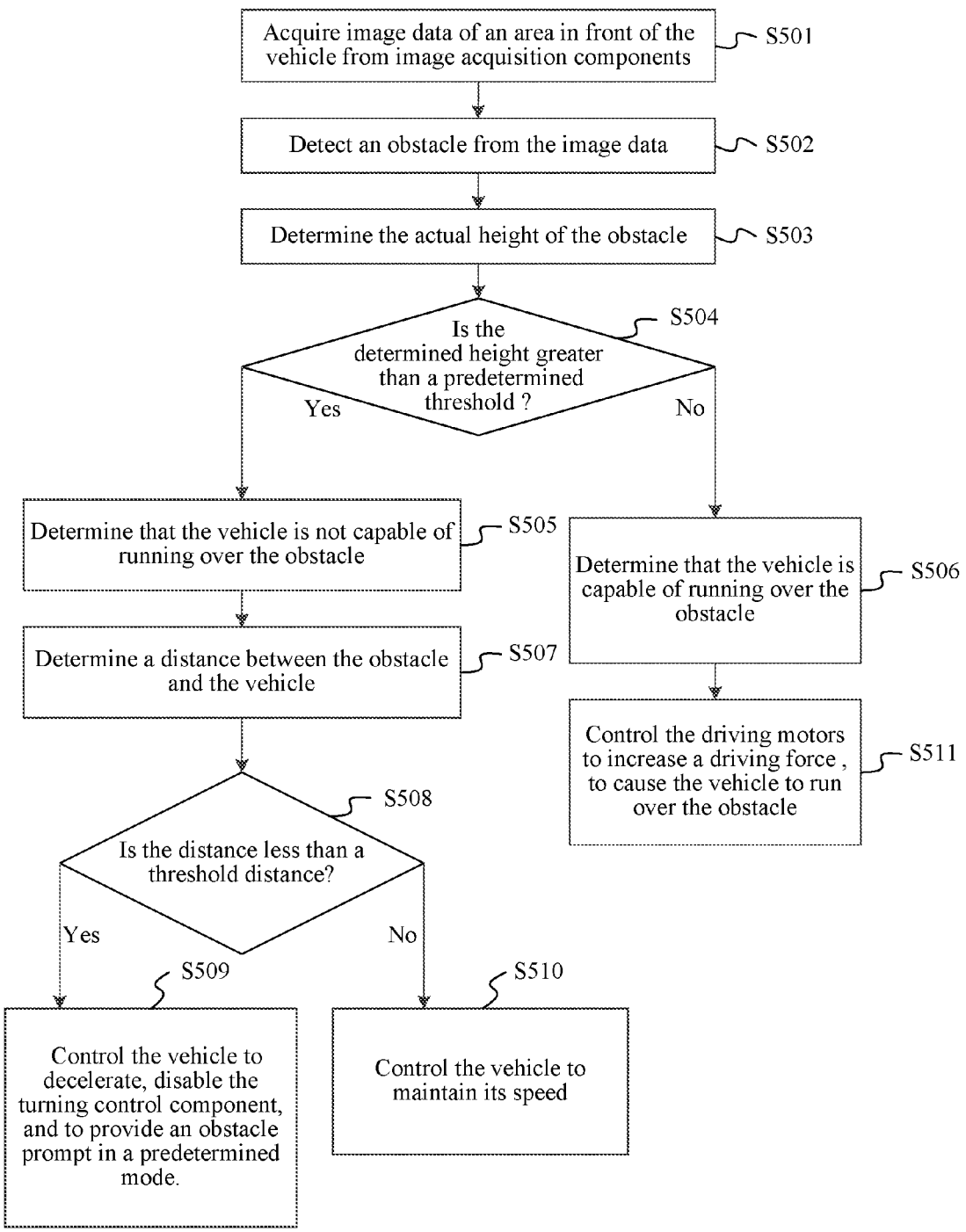
FIG. 5 is a flowchart illustrating a method for controlling a personal transportation vehicle, according to an exemplary embodiment.

FIG. 5 is a flowchart illustrating a method 500 for controlling a personal transportation vehicle, according to an exemplary embodiment. In some embodiments, the method 500 can be performed by a control system installed on a personal transportation vehicle (e.g., the personal transportation vehicle 100), with the control system including (or interfacing with) one or more image acquisition components. As shown in FIG. 5, the method 500 comprises steps S501 to S511.

In step S501, the image acquisition component acquires image data of an area in front of the vehicle.

In some embodiments, the image acquiring components may be mounted on each of the two wheel housings of a two-wheel self-balancing vehicle, or at a location where the load bearing pedal is engaged with the turning control component. In some embodiments, the control system may control the image acquiring components to acquire the image data repeatedly.

In step S502, the system may detect an obstacle from the image data. The detection can be based on, for example, a color difference between the ground and the obstacle, based on the pixel information included in the image data.

Figure 6:
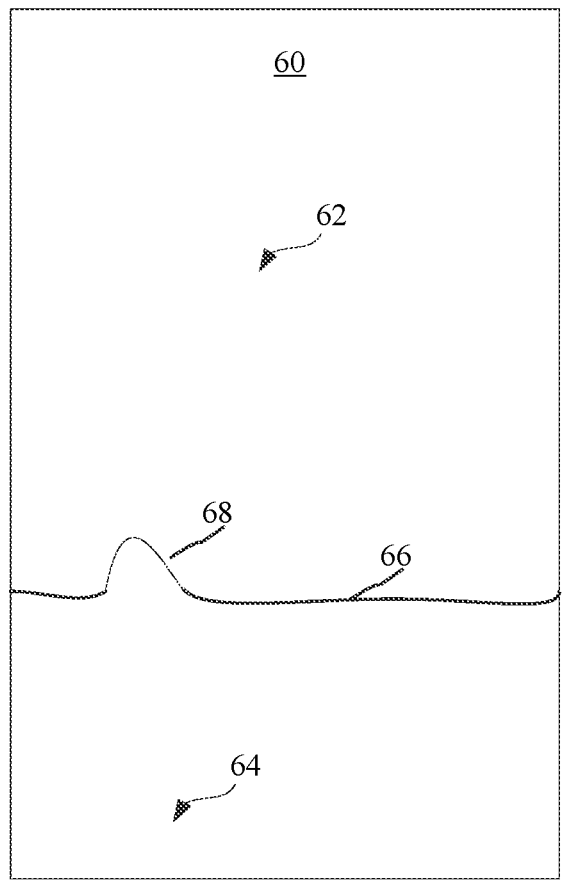
FIG. 6 is a diagram illustrating an obstacle detection determination result provided by the exemplary method of FIG. 5.

Reference is now made to FIG. 6, which illustrates an obstacle detection determination result provided by, for example, step S502 of FIG. 5. FIG. 6 illustrates an image frame 60 acquired by the image acquiring components. Based on a binary processing of the pixel data in the image frame 60 according to the color differences, the system then determines a first region 62 and a second region 64, and identifies a road line 66 between the first region 62 and the second region 64. The system then detects whether the road line 66 includes a protrusion 68. If the road line 66 includes a protrusion 68, the system can determine that the protrusion 68 corresponds to an obstacle.

Referring back to FIG. 5, after determining an obstacle from the image data, the system then proceeds to step S503 to determine the actual height of the obstacle. In some embodiments, the actual height determination can be based on a predetermined scale, and the height of the obstacle as it appears in the image data. As an illustrative example, assuming that the predetermined measuring scale is 1:3, the system can determine that the height of the obstacle, as it appears in the image data, is 1 cm. Based on these information, the system can determine that the actual height of the obstacle calculated is 3 cm (1 cm×3).

In some embodiments, the predetermined scale can be adjusted based on a distance between the vehicle and the obstacle. For example, the system can include a distance measuring component configured to measure a distance between the obstacle and the vehicle. The system can also maintain a mapping relation between the scale and the distance, with a smaller scale for a shorter distance. The system can determine the scale based on a determined distance. As an illustrative example, the system can determine, based on the mapping, that a measuring scale is 5 instead of 3 (e.g., if the vehicle is farther away). If the system also determines that the height of the obstacle as it appears in the image data is 1 cm, the system can then determine that the actual height of the obstacle is 5 cm.

In some embodiments, the system can also include at least two image acquisition components, and the system can determine the actual height of the obstacle according to a corresponding protrusion in two sets of image data acquired by the two image acquisition components, based on binocular imaging principle.

It is understood that the aforementioned height determination methods are provided for illustrative purpose only, and do not limit the scope of the present disclosure.

After the actual height of the obstacle is determined in step S503, the system will proceed to step S504 to determine whether the height of the obstacle is greater than a predetermined threshold. In some embodiments, the predetermined threshold can correspond to a maximum height of the obstacle that can be run over by the vehicle.

If the height of the obstacle is determined to be equal to or less than the predetermined threshold, in step S504, the system will proceed to step S506 and determine that the vehicle is capable of running over the obstacle. The system then proceeds to step S511 to control the driving motors to increase a driving force, to enable the two-wheel balance car to run over the obstacle.

On the other hand, if the height of the obstacle is determined to be equal to or less than the predetermined threshold, in step S504, the system will proceed to step S505 to determine that obstacle is too high to be run over by the vehicle. The system can then proceed to step S507 to determine a distance between the obstacle and the vehicle.

In some embodiments, the distance measurement can be based on information from the image acquisition components. As an illustrative example, the system can include two image acquisition components, and the system can determine a distance between the obstacle and the vehicle based on, for example, two sets of image data respectively acquired by the two image acquisition components, and the binocular imaging principle.

In some embodiments, the distance measurement can be based on information from the distance measuring components. As an illustrative example, For example, the system can determine the distance based on a transmission time of a transmitted signal and a reception time of a reflected signal that corresponds to the transmitted signal, as well as a speed of the vehicle.

It is understood that the aforementioned distance measurement schemes are provided as illustrative examples only, and do not limit the scope of the present disclosure.

After determining the distance between the obstacle and the vehicle, the system will proceed to step S508 to determining whether the distance is less than a predetermined threshold distance. In some embodiments, the predetermined distance can be determined based on, for example, a turning radius of the vehicle. The predetermined distance can also be determined based on, for example, a diameter of the wheels, other numerical values, etc., and is not limited by the examples provided in the present disclosure.

If the system determines in step S508 that the distance is greater than (or equal to) the threshold distance, the system will proceed to step S510 to maintain its speed (e.g., by transmitting a signal to the driving motors to maintain a driving force). On the other hand, if the system determines in step S508 that the distance is less than the threshold distance, the system will proceed to step S509 to control the vehicle to decelerate (e.g., by transmitting a signal to the driving motors to reduce a driving force), to reduce the likelihood of collision with the obstacle (or to reduce the impact force when the collision occurs).

Further, in step S509, the system also disables the turning control component to prevent the vehicle from turning in response to an instruction from the operator of the vehicle when the collision occurs, to reduce the likelihood of the operator falling over when the vehicle making a turn when hitting the obstacle.

In some embodiments, in step S509, the system also provides an obstacle prompt in a predetermined mode. The predetermined mode comprises at least one of: causing a speaker to play a prompt tone, causing a predetermine part of the personal transportation vehicle to vibrate, causing a signal light to flicker, etc.

With embodiments of the present disclosure, the system can detect an obstacle in front of the vehicle and determine, based on the image data acquired by the image acquisition components, information about a height and a distance of the obstacle. The system can determine whether the vehicle is capable of running over that obstacle based on the height and distance information. If the system determines that the vehicle is not capable of running over the obstacle, it can control the vehicle to decelerate, to reduce the likelihood of collision with the obstacle (or to reduce the impact force when the collision occurs). Further, the system can also disable the turning control components to prevent the vehicle from turning in response to an instruction from the operator of the vehicle when the collision occurs, to reduce the likelihood of the operator falling over when the vehicle making a turn when hitting the obstacle. As a result, the safety of the vehicle operation can be improved.

Figure 7:
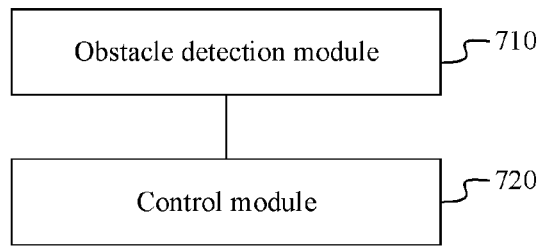
FIG. 7 is a block diagram illustrating a system for controlling a personal transportation vehicle, according to an exemplary embodiment.

FIG. 7 is a block diagram illustrating a system 700 for controlling a personal transportation vehicle, according to an exemplary embodiment. In some embodiments, the system 700 can be used to control, for example, the personal transportation vehicle 100 of FIG. 1. As shown in FIG. 7, the system 700 includes, at least, an obstacle detection module 710, and a control module 720.

The obstacle detection module 710 is configured to determine information about an obstacle in front of the vehicle, such as whether the obstacle is low enough to be run over by the vehicle.

The control module 720 is configured to control the personal transportation vehicle to decelerate, and to prevent the personal transportation vehicle from making a turn (e.g., by disabling the turning control component 130), if the obstacle detection module 710 determines that the obstacle is too high to be run over by the vehicle.

With embodiments of the present disclosure, a control system (e.g., system 700) can determine information about the height of an obstacle in front of a personal transportation vehicle. If the control system determines that the obstacle is too high to be run over by the vehicle, the control system can control the personal transportation vehicle to decelerate, and to prevent the personal transportation vehicle from making a turn. Such arrangements can reduce the likelihood that one of the wheels of the vehicle becomes blocked by the obstacle and the other wheel continues moving, such that the vehicle gets into a spinning motion and causes the operator to fall over. As a result, the safety of the vehicle operation can be improved.

Figure 8:
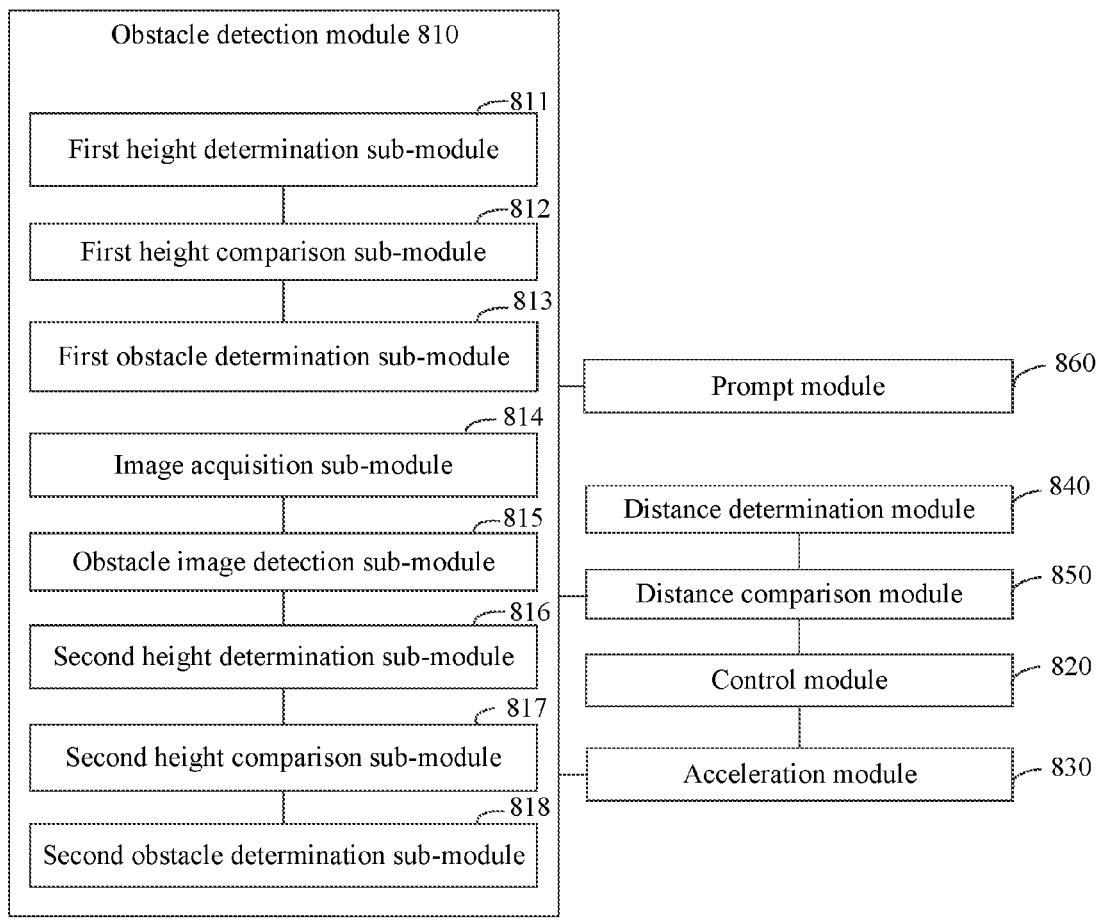
FIG. 8 is a block diagram illustrating a system for controlling a personal transportation vehicle, according to an exemplary embodiment.

FIG. 8 is a block diagram illustrating a system 800 for controlling a personal transportation vehicle, according to an exemplary embodiment. In some embodiments, the system 800 can be used to control, for example, the personal transportation vehicle 100 of FIG. 1. As shown in FIG. 8, the system 800 includes, at least, an obstacle detection module 810.

The obstacle detection module 810 is configured to determine information about an obstacle in front of the vehicle, such as whether the obstacle is low enough to be run over by the vehicle.

In some embodiments, the obstacle detection module 810 may comprise: a first height determination sub-module 811, a first height comparison sub-module 812, and a first obstacle determination sub-module 813.

The first height determination sub-module 811 is configured to determine a height of the obstacle in front of the vehicle by, for example, one or more distance measuring components. The first height comparison sub-module 812 is configured to determine whether the height of the obstacle, determined by the first height determination sub-module 811, exceeds a predetermined threshold. The first obstacle determination sub-module 813 is configured to determine whether the vehicle is capable (or not capable) of running over the obstacle, based on the determination of the first height comparison sub-module 812. In some embodiments, the first height determination sub-module 811, the first height comparison sub-module 812, and the first obstacle determination sub-module 813 can be configured to perform at least steps S301-S304 of method 300 of FIG. 3.

In some embodiments, the obstacle detection module 810 may further comprise: an image acquisition sub-module 814, an obstacle image detection sub-module 815, a second height determination sub-module 816, a second height comparison sub-module 817, and a second obstacle determination sub-module 818.

The image acquisition sub-module 814 is configured to acquire image data of an area in front of the vehicle by, for example, one or more image acquisition components.

The obstacle image detection sub-module 815 is configured to detect, from the image data acquired by the image acquisition sub-module 814, an obstacle.

The second height determination sub-module 816 is configured to determine a height of the obstacle detected by the obstacle image detection sub-module 815.

The second height comparison sub-module 817 is configured to determine whether the height of the obstacle, determined by the second height determination sub-module 816, exceeds a predetermined threshold.

The second obstacle determination sub-module 818 is configured to determine whether the vehicle is capable (or not capable) of running over the obstacle, based on the determination of the second height comparison sub-module 817. In some embodiments, the image acquisition sub-module 814, the obstacle image detection sub-module 815, the second height determination sub-module 816, the second height comparison sub-module 817, and the second obstacle determination sub-module 818 are configured to perform at least steps S501-S506 of method 500 of FIG. 5.

The system 800 further comprises a distance determination module 840, a distance comparison module 850, a control module 820, and an acceleration module 830.

The distance determination module 840 is configured to determine a distance from the obstacle to the vehicle. The distance comparison module 850 is configured to determine whether the distance measured by the distance determination module 840 is less than a predetermined threshold distance.

If the distance is determined to be less than the threshold distance, and that the vehicle is not capable of running over the obstacle, the control module 820 will be configured to control the vehicle to decelerate (e.g., by transmitting a signal to the driving motors to reduce a driving force), and to disable the turning control component. If the distance is determined to be equal to or greater than the threshold distance, the control module 820 will be configured to control the vehicle to maintain its speed (e.g., by transmitting a signal to the driving motors to maintain a driving force).

Further, if the system (e.g., first obstacle determination sub-module 813, second obstacle determination sub-module 818, etc.) determines that the vehicle is capable of running over the obstacle, the acceleration module 830 will be configured to transmit a signal to the driving motors, to cause the driving motors to increase a driving force, to cause the vehicle to run over the obstacle.

In some embodiments, the system 800 further comprises a prompt module 860 configured to provide an obstacle prompt in a predetermined mode, if the system (e.g., first obstacle determination sub-module 813, second obstacle determination sub-module 818, etc.) determines that the vehicle is not capable of running over the obstacle. The predetermined mode comprises at least one of: causing a speaker to play a prompt tone, causing a predetermine part of the vehicle to vibrate, and causing a signal light to flicker. In some embodiments, the distance determination module 840, the distance comparison module 850, the control module 820, the acceleration module 830, and the prompt module can be configured to perform at least steps S305 to S309 of the method 300 of FIG. 3, and at least steps S507 to S511 of the method 500 of FIG. 5.

Figure 9:
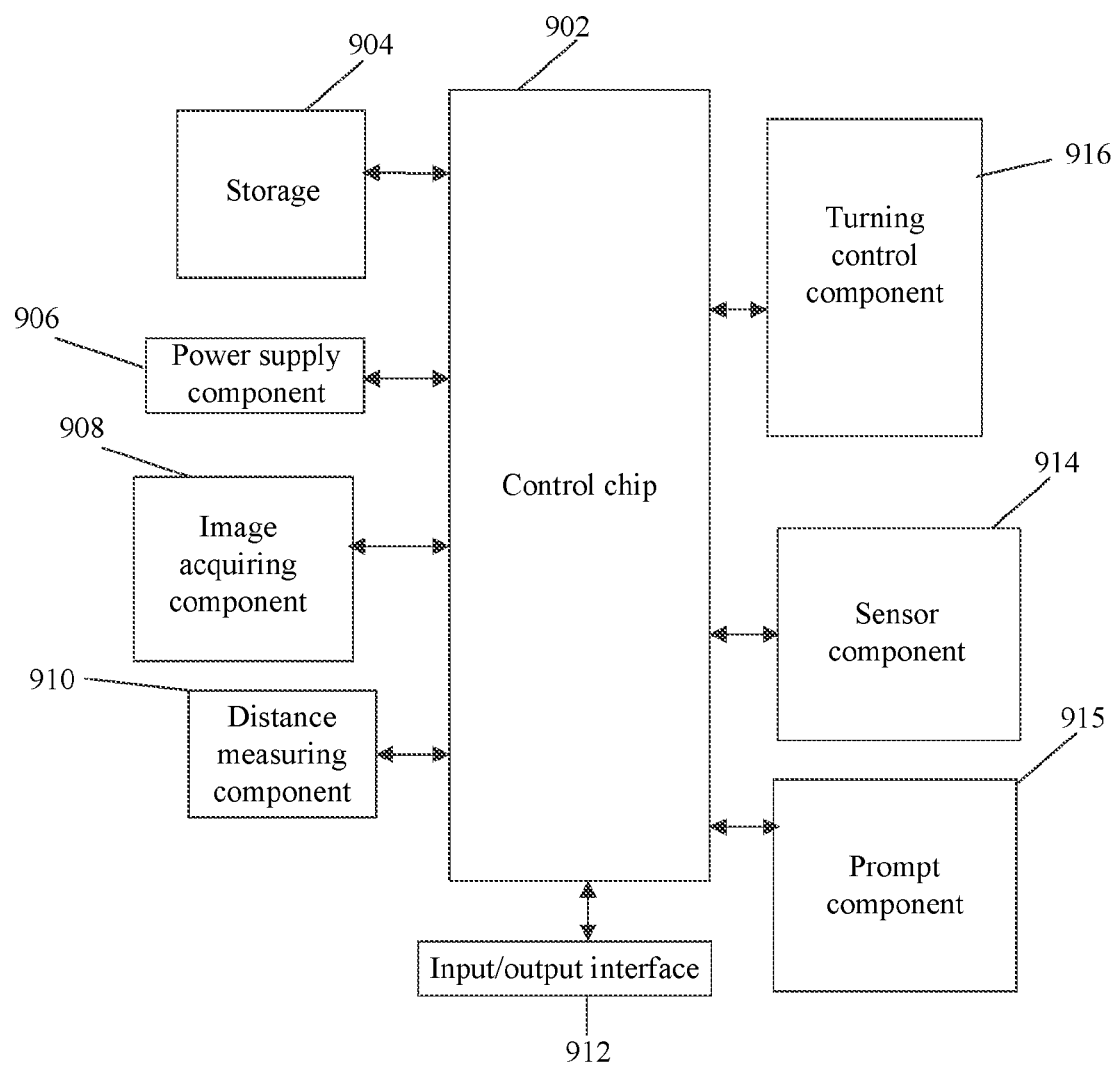
FIG. 9 is a block diagram illustrating an apparatus for controlling a personal transportation vehicle, according to an exemplary embodiment.

FIG. 9 is a block diagram illustrating an apparatus 900 for controlling a personal transportation vehicle, according to an exemplary embodiment. As shown in FIG. 9, the apparatus 900 may comprise one or more of a control chip 902, a storage 904, a power supply component 906, an image acquiring component 908, a distance measuring component 910, an input/output (I/O) interface 912, a sensor component 914 and a turning control component 916. The apparatus 900 can be used to interact with different components of a personal transportation vehicle (e.g., the personal transportation vehicle 100 of FIG. 1).

The control chip 902 generally exerts an overall control of the personal transportation vehicle, such as operations related to moving forward, moving backward, acceleration, deceleration, and turning. Besides, the control chip 902 may also comprise one or more modules to facilitate interaction between the control chip 902 and other components. For example, the control chip 902 may comprise an image acquisition module to facilitate interaction between the image acquiring components 908 and the control chip 902.

The storage 904 is configured to store various types of data so as to support operations of the personal transportation vehicle. Examples of these data comprise any instructions, image data and distance data of the two-wheel balance car to be operated on the two-wheel balance car 900. The storage 904 can be implemented by any type of volatile or nonvolatile storage devices or a combination thereof. The storage 904 can provide a non-transitory computer readable medium to store instructions that correspond to any of the modules and sub-modules of FIGS. 7 and 8. The instructions, when executed by the control chip 902, may also cause the control chip 902 to perform, for example, the methods 200, 300 and 500 of FIG. 2, FIG. 3, and FIG. 5. The storage 904 may include, for example, Static Random Access Memory (SRAM), Electrically Erasable Programmable Read Only Memory (EEPROM), Erasable Programmable Read Only Memory (EPROM), Programmable Read Only memory (PROM), Read Only Memory (ROM), magnetic memory, flash memory, magnetic disk or optical disc.

The power supply component 906 supplies electric power to various components of the personal transportation vehicle. The power supply component 906 may include a power supply management system, one or more power supplies, and other components related to generation, management and electric power distribution of the personal transportation vehicle.

The image acquisition component 908 is installed on the personal transportation vehicle. In some embodiments, the image acquisition component 908 comprises a front camera and/or a rear camera. When the personal transportation vehicle is in an operation mode, such as capture mode or video mode, the front camera and/or rear camera can receive external multimedia data. Each of the front camera and the rear camera can be a fixed optical lens system or can have focal lengths and optical zoom functionality.

The distance measuring component 910 is configured to transmit and/or receive a signal. For example, the distance measuring component 910 includes a laser transmitter and a laser receiver. When the personal transportation vehicle is in an operation mode, such as when it receives a reflected laser signal, the laser receiver is configured to receive the reflected laser signal. Information about the received reflected signal can be further stored in the storage 904.

The I/O interface 912 provides interface between the control chip 902 and the peripheral interface modules, and the peripheral interface modules may be USB flash disk and audio player, etc.

The sensor component 914 comprises one or more sensors for providing condition assessment of the personal transportation vehicle. For example, the sensor component 914 can detect an open/close state of the personal transportation vehicle, and can detect a change in an orientation or in an acceleration/deceleration of the personal transportation vehicle. The sensor component 914 may comprise a proximity sensor which is configured for detecting the existence of nearby objects without physical contact. The sensor component 914 may also comprise an optical sensor, such as CMOS or CCD image sensor, to be used in imaging applications. In some embodiments, the sensor component 914 may also comprise an acceleration sensor, a gyroscope sensor, a magnetic sensor, a pressure sensor, and/or a temperature sensor.

The turning control component 916 is configured to control of the turning of the personal transportation vehicle. The turning control component 916 may detect a body movement of an operator (e.g., a movement of legs) and control the turning accordingly.

In exemplary embodiments, at least a part of the apparatus 900 (e.g., the control chip 902) can be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor or other electronic elements, for performing the above mentioned control methods for a personal transportation vehicle.

Further, in some embodiments, the control chip 902 and the storage 904 can be part of a mobile terminal (e.g., a smart phone), and can interact with the rest of the components (e.g., the image acquiring component 908, the distance mearing component 910, the sensor component 914, the turning control component 916, etc.) either wirelessly (e.g., Bluetooth), or via wired data buses.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling a personal transportation vehicle, the method performed by a processor coupled with one or more driving motors of the personal transportation vehicle and with a turning control component, the method comprising:
   determining information about a height of an obstacle;
   determining, based on the information about the height of the obstacle, whether the personal transportation vehicle is capable of running over the obstacle;
   when determining that the personal transportation vehicle is not capable of running over the obstacle:
      transmitting a first signal to the one or more driving motors to reduce a driving force, to cause the personal transportation vehicle to decelerate, and
      transmitting a second signal to disable the turning control component; and
   when determining that the personal transportation vehicle is capable of running over the obstacle, transmitting a third signal to the one or more driving motors to increase the driving force, to cause the personal transportation vehicle to run over the obstacle.

2. The method according to claim 1, wherein the information about a height of an obstacle is determined based on data received from a distance measuring component; wherein determining whether the personal transportation vehicle is capable of running over the obstacle comprises:
   determining whether the height of the obstacle is greater than a predetermined threshold, and
   if it is determined that the height of the obstacle is greater than the predetermined threshold, determining that personal transportation vehicle is not capable of running over the obstacle.

3. The method according to claim 2, further comprising if it is determined that the height of the obstacle is lower than or equal to the predetermined threshold, determining that the personal transportation vehicle is capable of running over the obstacle.

4. The method according to claim 1, further comprising:
   acquiring, from an image acquiring component, image data of an area; and
   detecting the obstacle from the image data;
   wherein the information about the height of the obstacle is determined based on the image data.

5. The method according to claim 1, further comprising:
   determining a distance between the obstacle and the personal transportation vehicle;
   determining whether the distance is less than a predetermined threshold distance;
   wherein the first and second signals are transmitted after determining that the distance is less than the predetermined threshold distance.

6. The method according to claim 1, further comprising:
   after determining that the personal transportation vehicle is not capable of running over the obstacle, providing an obstacle prompt in a predetermined mode;
   wherein the predetermined mode comprises at least one of: causing a speaker to play a prompt tone, causing a predetermined part of the personal transportation vehicle to vibrate, or causing a signal light to flicker.

7. A personal transportation vehicle, comprising:
   at least two parallel wheels;
   a control chip;
   a storage for storing instructions executable by the control chip;
   a turning control component coupled with the control chip;
   wherein, the control chip is configured to:
      determine information about a height of an obstacle;
      determine, based on the information about the height of the obstacle, whether the personal transportation vehicle is capable of running over the obstacle;
      when determining that the personal transportation vehicle is not capable of running over the obstacle:

transmit a first signal to the one or more driving motors to reduce a driving force, to cause the personal transportation vehicle to decelerate, and transmit a second signal to disable the turning control component; and when determining that the personal transportation vehicle is capable of running over the obstacle, transmit a third signal to the one or more driving motors to increase the driving force, to cause the personal transportation vehicle to run over the obstacle.

8. The personal transportation vehicle according to claim 7, wherein the information about a height of an obstacle is determined based on data received from a distance measuring component; wherein the control chip is also configured to:

determine whether the height of the obstacle is greater than a predetermined threshold, and if it determined that the height of the obstacle is greater than the predetermined threshold, determine that the personal transportation vehicle is not capable of running over the obstacle.

9. The personal transportation vehicle according to claim 7, wherein the control chip is also configured to:

if it is determined that the height of the obstacle is lower than or equal to the predetermined threshold, determine that the personal transportation vehicle is capable of running over the obstacle.

10. The personal transportation vehicle according to claim 7, wherein the control chip is also configured to:

acquire, from an image acquiring component, image data of an area; and detect the obstacle from the image data;

wherein the information about the height of the obstacle is determined based on the image data.

11. The personal transportation vehicle according to claim 7, wherein the control chip is also configured to:

determine a distance between the obstacle and the personal transportation vehicle;

determine whether the distance is less than a predetermined threshold distance;

wherein the first and second signals are transmitted after determining that the distance is less than the predetermined threshold distance.

12. The personal transportation vehicle according to claim 7, wherein the control chip is also configured to:

after determining that the personal transportation vehicle is not capable of running over the obstacle, provide an obstacle prompt in a predetermined mode;

wherein the predetermined mode comprises at least one of: causing a speaker to play a prompt tone, causing a predetermined part of the personal transportation vehicle to vibrate, or causing a signal light to flicker.

13. A non-transitory computer-readable storage medium having stored therein instructions that, when executed by a processor of an apparatus, causes the apparatus to perform a method for controlling a personal transportation vehicle, the method comprising:

determining information about a height of an obstacle;

determining, based on the information about the height of the obstacle, whether the personal transportation vehicle is capable of running over the obstacle;

when determining that the personal transportation vehicle is not capable of running over the obstacle:

transmitting a first signal to the one or more driving motors to reduce a driving force, to cause the personal transportation vehicle to decelerate, and transmitting a second signal to disable the turning control component; and when determining that the personal transportation vehicle is capable of running over the obstacle, transmitting a third signal to the one or more driving motors to increase the driving force, to cause the personal transportation vehicle to run over the obstacle.

* * * * *